March 15, 1932.    C. R. SCHEIDELL    1,849,695
VEHICLE HEADLIGHT
Filed March 18, 1930
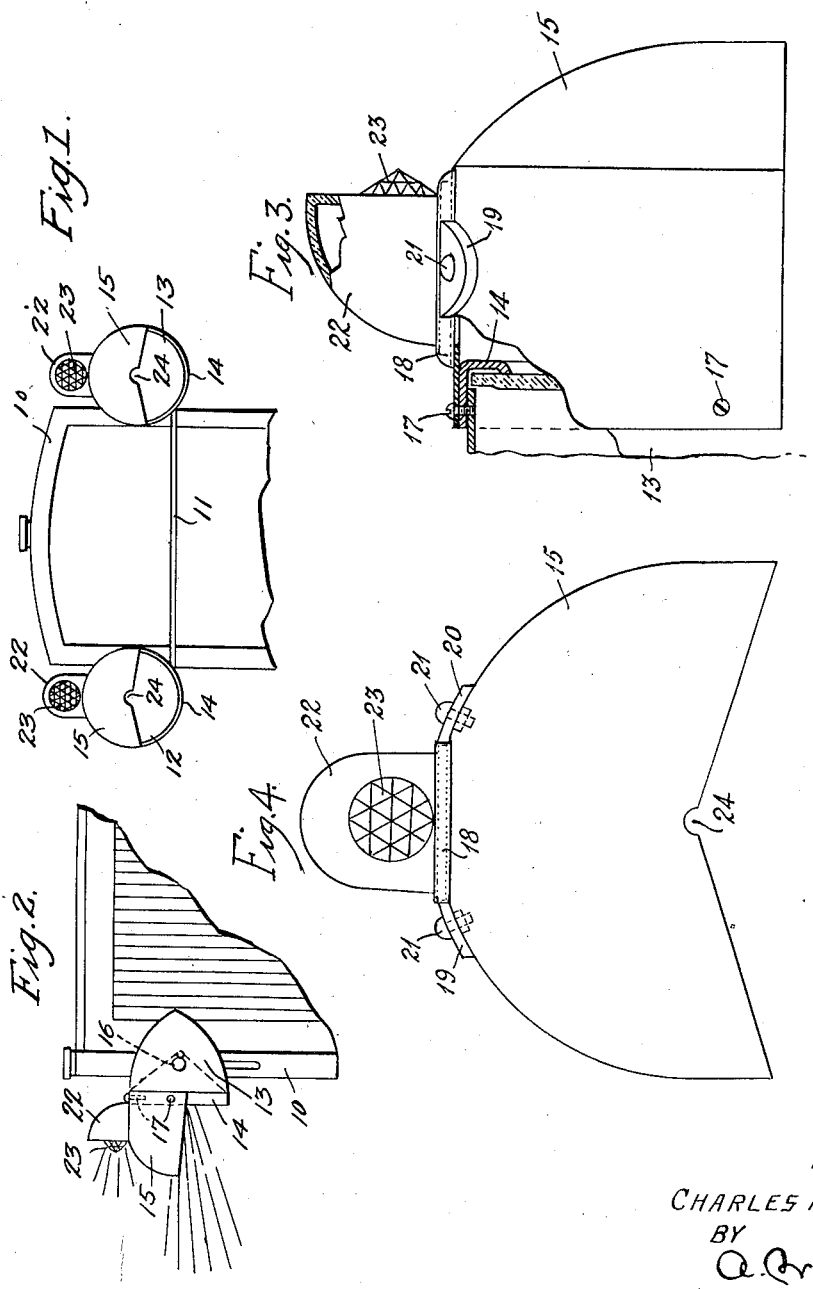
INVENTOR
CHARLES R. SCHEIDELL
BY
*A. W. Weller*
ATTORNEY Patented Mar. 15, 1932

1,849,695

UNITED STATES PATENT OFFICE

CHARLES R. SCHEIDELL, OF BROOKLYN, NEW YORK

VEHICLE HEADLIGHT

Application filed March 18, 1930. Serial No. 436,687.

My invention relates to vehicle headlights and more particularly to headlights for automotive vehicles.

An object of the invention is to provide a simple attachment for the headlight of an automobile which will, under the conditions of use and adaptation hereinafter described, apprise the driver of the automobile of the fact that one or the other, or both, of the headlights on the car are out, irrespective of the condition of time or corresponding degree of visibility ordinarily sufficient of itself, to convey such information.

A further object of the invention is to provide a device, the use of which will insure even in the total darkness of night a perception by the driver of a car approaching from the direction opposite that in which the car equipped with my device is traveling, of the fact that he is approaching such car even though the lights of such car are out.

Another object of the invention is the provision of a simple, practical and economical attachment of unitary character which can be manufactured on an industrial scale and which can be attached to standard automobile headlights without changing the construction of such headlights.

Other objects of the invention will appear from the description hereinafter given when taken in connection with the accompanying drawings illustrating an embodiment of the invention and forming part of this specification and in which:

Fig. 1 is a front view of the radiator and headlights of an automobile equipped with the attachment embodying my invention;

Fig. 2 is a side view thereof;

Fig. 3 is a side view of a shield attached to the headlight and equipped with my device, the former being shown partly in section to illustrate the manner of mounting the device thereon; and Fig. 4 is a front view of the shield and attachment.

Referring more particularly to the drawings, in which similar reference characters identify similar parts in the several views, the radiator 10 has the usual cross bar 11 for supporting the casings 12 and 13 of a pair of headlights. To the outer rim 14 of each of these casings is attached a shield 15, usually of aluminum, for directing the rays from the light bulb 16 in a stream substantially parallel to, or below, the horizontal plane, so that the rays of the light will be directed on the road ahead illuminating the same for a substantial and usual distance without throwing such rays substantially above the horizontal plane of the bulb, into the eyes of the driver of a car approaching from the opposite direction. The range of light is thus substantially restricted to the surface of the road. The shield 15 is attached to the rim 14 by screws or rivets 17.

On each of the shields 15 is mounted, by means of a base plate 19, outwardly-extending flanges 19, 20, and screws or rivets 21, a casing 22 of glass in the form of a kiosk, containing a prismatic or many-sided body 23 of colored glass or other light reflecting material. The interior of the casing 22 is, as shown by the dotted lines in Fig. 2, within the range of the rays of light emanating from the electric bulb 16, the light from said bulb being permitted to enter the interior of the casing through an aperture in the bottom of said casing in juxtaposition over an aperture in the top of the shield 15. The light entering the casing 22 will strike the colored prismatic-bodied reflector 23 and will be reflected, through the glass of casing 22 without glare, to the driver in the car. The glass of casing 22 is preferably of a light absorbing capacity such as a dark red or green glass (a translucent glass), so that only sufficient light might be transmitted therethrough to indicate to the driver that his lights are on.

While one of the objects of my invention is to have my device apprise the driver of the fact that his headlights are out, thereby eliminating the frequent embarrassment of being stopped and arrested by a police officer, giving him a court summons. Other very useful and important purposes are served by my new headlight structure. It is frequently the case on a dark country road, which may not be lighted at all or which is inadequately lighted, that the automobile headlights go out of commission. In a gathering dusk, when it is still light enough to see a short distance ahead so that one can proceed, though with care, a real danger resides in the fact that the driver of a car approaching from the opposite direction will not be aware of the fact that he is meeting another car, whose lights are out, until it is too late. My invention is designed to do away with such danger. When a car is still some distance from another approaching it from the opposite direction, the lights of the second car being out, the light from the headlights of the first car will be directed upon the colored prismatic bodied reflectors 23 and such reflectors will give a glow of sufficient intensity to be clearly visible from the distance of the approaching car and thus will avoid a collision.

In order to further insure a proper focusing of the rays of the headlights of one car upon the reflectors with which the approached car may be equipped, I prefer to have the shield 15 provided, at a point thereon in line with the focal line of the bulb 16, with an aperture 24 of substantially semicircular outline, permitting a portion of the rays from bulb 16 to be inclined upwardly, so as to include, within their range, the colored reflector of an approaching car, though such reflector is at a higher level.

There is still one greater danger, greater because more frequent in occurrence, which the use of my invention eliminates. It is well known, that if one of a pair of headlights on a car goes out of commission, the driver will take his chances on driving with a single light no matter how dark the road ahead as even a single light will illuminate the road sufficiently for his own purpose. But he reckons without the plight of the driver approaching from the opposite direction who is at a loss to guess which of the two lights is out. If he guesses that it is the one on the left, as he approaches, and he is wrong, a collision is inevitable, if the road is a narrow one accommodating only two cars. If he thinks it is the right one that is out and he is wrong, he may steer too wide and into the ditch along the road. With my single reflector device, the approaching driver will be forewarned as to which, if only one, of the two lights is out as in its place he will perceive the glow of the colored glass.

While I have described a particular embodiment of my invention, it is obvious that various modifications thereof and in the arrangement of parts may be made without departing from the invention.

I claim:

An attachment for an automobile headlight, comprising a shield having the lower part thereof open and having a light port in the top thereof, an auxiliary casing superposed on the top of said shield and in communication with the interior thereof via said light port, said casing being constituted of an integral glass body having the rear thereof frosted, and a prismatic reflector in the front of said auxiliary casing.

CHARLES R. SCHEIDELL.